(No Model.) 3 Sheets—Sheet 1.
E. P. CROSBY.
COMBINATION TOOL.
No. 389,549. Patented Sept. 18, 1888.
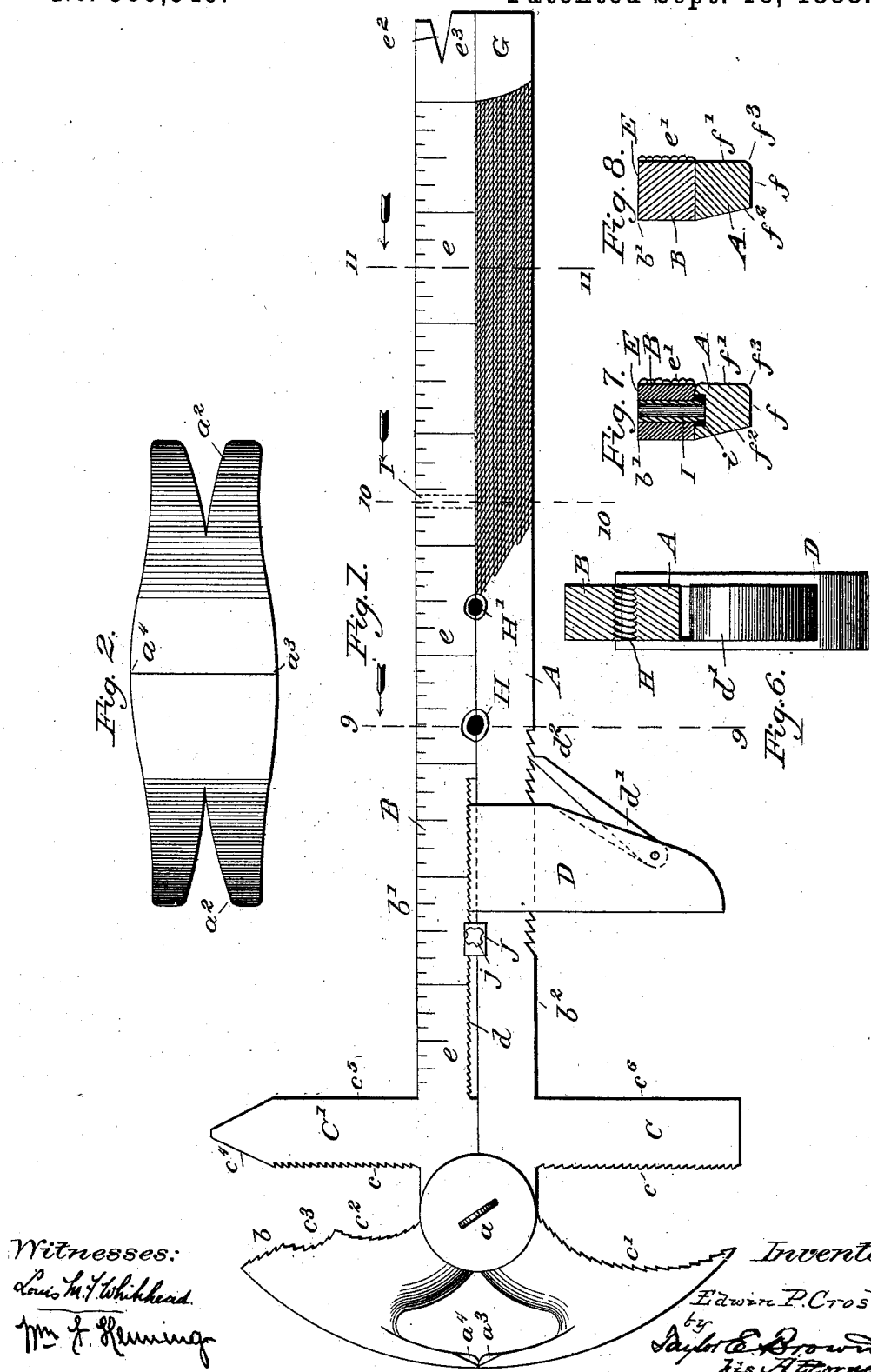
Witnesses:
Louis M. Whitehead
Wm. F. Henning
Inventor:
Edwin P. Crosby,
by Taylor E. Brown
his Attorney (No Model.) 3 Sheets—Sheet 2.
E. P. CROSBY.
COMBINATION TOOL.
No. 389,549. Patented Sept. 18, 1888.
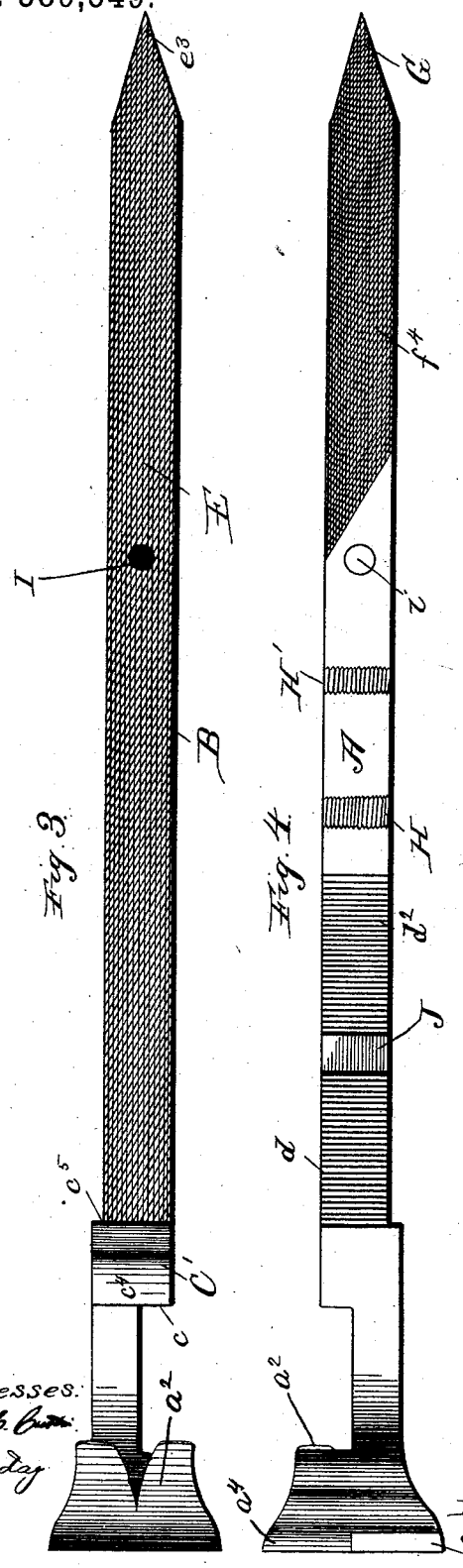
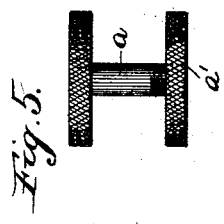

(No Model.) 3 Sheets—Sheet 3.
E. P. CROSBY.
COMBINATION TOOL.
No. 389,549. Patented Sept. 18, 1888.
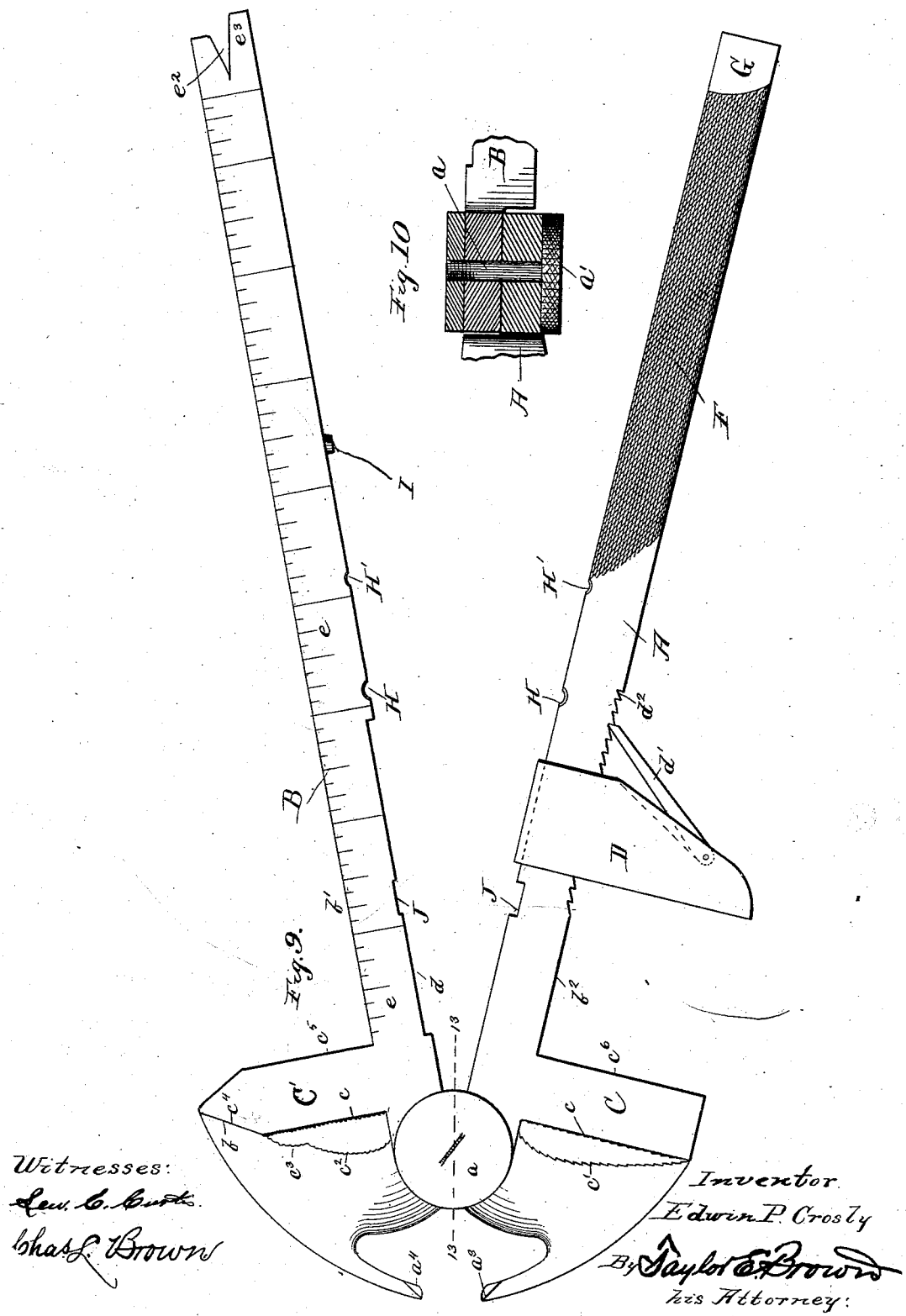
Witnesses:
Lew. C. Curtis.
Chas. L. Brown
Inventor.
Edwin P. Crosby
By Taylor E. Brown
his Attorney.

UNITED STATES PATENT OFFICE.

EDWIN P. CROSBY, OF CHICAGO, ILLINOIS.

COMBINATION-TOOL.

SPECIFICATION forming part of Letters Patent No. 389,549, dated September 18, 1888.

Application filed May 13, 1887. Serial No. 238,156. (No model.)

*To all whom it may concern:*

Be it known that I, EDWIN P. CROSBY, a citizen of the United States, residing at Chicago, in the county of Cook and State of Illinois, have invented a certain new and useful Improvement in Combination-Tools; and I do hereby declare the following to be such a full, clear, and exact description of the invention as will enable others skilled in the art to which it appertains to make and use the same, reference being had to the accompanying drawings, forming a part of this specification, and in which similar letters of reference indicate like parts throughout the several figures.

This invention is designed to furnish in one simple, strong, and complete implement all the necessary tools which are usually required by those persons who have "tinkering" or repairing to do at home or on the farm where the distance to the repair-shop and the expense of transportation of the broken part is a matter of great account to the owner. It is designed also for use with machines, agricultural or otherwise, which are worked or used in the field, and by the use of which tool a broken part may be speedily repaired or a bolt tightened at once without returning to the shop. It is designed also to be carried upon wagons or other vehicles in use for long journeys, and which may be disabled en route; and the invention consists in the ingenious selection and combination of those tools most required for the above purposes.

In the drawings, Figure 1 illustrates in a plan view my new combination-tool; Fig. 2, an end view showing the claws. Figs. 3 and 4 are edge views of the two parts of the implement. Fig. 5 illustrates the screw-rivet that secures the two parts of the implement together. Figs. 6, 7, and 8 are vertical sectional views taken on lines 9 9, 10 10, and 11 11, respectively, of Fig. 1, looking in the direction indicated by the arrow. Fig. 9 is a plan view of the implement similar to Fig. 1, illustrating the position when the handles are opened; and Fig. 10 is a vertical sectional view on line 13 13 of Fig. 9, illustrating the manner of securing the handles together.

The letter A represents one part of the handle and B the other, movably secured together by the removable rivet or bolt $a$, so as to open and close thereon, which pin or bolt passes through both parts A B, and is secured by the nut $a'$.

Beyond the rivet $a$ each part is extended in a curved form, as shown in Fig. 1, the central portions meeting when the handles A and B are closed. Each end is bifurcated, as more clearly shown in Fig. 2, forming the claws $a^2$. Where these ends join or meet I form a pair of nippers and a pair of pinchers, each one extending one-half across the width or face of the ends. The cutting-nippers $a^3$ are formed by cutting away sharply one-half of the under side of these ends, as shown at Figs. 1 and 4, and the pinchers $a^4$ are formed by rounding the under side of the other half of the same.

The hammer C is a part of the handle A, and the peen or rivet hammer C' is a part of the handle B. Each hammer is provided with a corrugated face, $c$. The under part of each end or claw is curved and corrugated in like manner, so that with the hammers a pipe-wrench is formed at $c'\ c^2\ c^3$ of three sizes. The angle portion $b$ registers with the inclined portion $c^4$ of the hammer C', and form pliers having a somewhat wider inside face than the pinchers $a^4$, as clearly illustrated in Fig. 9. The face $c^5$ is at right angles with the face or edge $b'$ of the handle B, forming a try-square therewith, and the face $c^6$ of the hammer C is at right angles with the edge $b^2$, also forming a try-square therewith. When required to use this square the jaw D may be removed.

Upon the handle A and surrounding the same is the jaw D, which forms the monkey-wrench with the hammer C. A slot, $d$, in the handle B enables the jaw D to be moved to and from the hammer C, while the pawl $d'$ on the jaw D, engaging the ratchet-teeth $d^2$ in the edge of the handle A, retains the jaw in any desired position.

The face of the handle B which forms the straight-edge or try-square with the peen-hammer is made with a very fine-cut file, E, while the top and bottom faces are provided with rule $e$ and rasp $e'$, respectively. The end of the handle B is bifurcated, as shown, to make the claw $e^2$ and the screw-driver $e^3$.

The handle A is made with a file, F, on one face, another file, $f\ f'$, on the side and bottom faces. The face with the file F thereon is beveled, as shown at $f^2$, thus making an angle file with the file $f$, while the corner $f^3$, being rounded, makes a round file.

The end of the handle A is made tapering to a sharp edge to form the chisel G.

H H' are dies cut on the adjacent edges of the handles A B, so as to cut threads upon bolts and the like. I prefer to make them of different sizes.

I is a round hollow punch or knife secured in the handle B and registering with the seat $i$ in the handle A, so as to punch holes in leather and the like.

J is a slot or recess in which to set the tap $j$ for cutting a thread in a nut or within a pipe, &c.

The entire implement is to be made of the best material, preferably of steel throughout, and of any required size. The inside edge or face of the handle A is also made a file, $f^4$, so as to form a "three-cornered" file with the file F.

Having now described my invention, what I claim, and desire to secure by Letters Patent, is as follows:

1. A tool consisting of two handles, A B, pivotally secured together at $a$ and having short arms bifurcated at $a^2$, the bifurcated ends of said arms meeting at $a^3$ to form cutting-nippers, and at $a^4$ to form pinchers, hammers C C', integral with and at right angles to said handles A B, each having a roughened face, $c$, the short arm of the handle A having roughened edges $c^2$ $c^3$, and the short arm of the handle B having roughened edge $c'$, said edges $c'$ $c^2$ $c^3$ registering with the edges $c$ of the hammers C C', said handle being provided on its end opposite the short arms with a chisel, G, and upon its intermediate surfaces with files $f f' f^2 f^3$, and having also upon the edge adjacent to the handle B a seat, $i$, said handle B having a measurement-scale, $e$, upon one face, a rasp, $e'$, upon its opposite face and provided with a bifurcated end forming the screw-driver $e^3$, the nail-claw $e^2$, and having a punch, I, registering with the seat $i$ in the handle A, said handle B having also a straight-edge, $b'$, at right angles with the straight-edge $c^5$ of the hammer C', the jaw D movably mounted upon said handle A, having a pawl, $d'$, adapted to engage teeth $d^2$ on said handle, and the dies H H and recess J and the tap $j$, arranged at suitable intervals in the adjacent edges of the handles A B, substantially as described.

2. A combination-tool comprising two handles, A B, pivotally secured together, the handle B being provided at its edge adjacent to the other handle with a recess, $d$, a dog, D, movably secured upon the handle A and partially fitting within the recess $d$ when the said handles are closed, substantially as described, of a hammer, C, integral with the handle A and provided with a face, $c^6$, dog D, having a pawl, $d'$, adapted to engage ratchet-teeth $d^2$ upon the handle A, whereby said hammer C and dog D constitute a monkey-wrench, said handles A B being provided with short arms bifurcated at $a^2$, meeting at $a^3$, forming cutting-nippers, and at $a^4$ to form pinchers, substantially as described.

EDWIN P. CROSBY.

Witnesses:
TAYLOR E. BROWN,
WM. S. BATES.